Feb. 11, 1941.   J. S. C. MOODY ET AL   2,231,083
METHOD OF MAKING DESIGNED RUBBER ARTICLES
Filed May 20, 1937

INVENTORS
Joseph S. C. Moody
Hugh M. Phinney
BY
Rowland V. Patrick
ATTORNEY

Patented Feb. 11, 1941

2,231,083

UNITED STATES PATENT OFFICE 2,231,083

METHOD OF MAKING DESIGNED RUBBER ARTICLES

Joseph S. C. Moody, Somerville, and Hugh M. Phinney, Cambridge, Mass.

Application May 20, 1937, Serial No. 143,768

4 Claims. (Cl. 41—33)

This invention relates to the transfer of colored or plain designs, pictures or printed matter to rubber, and is a continuation in part of our prior co-pending application, Serial No. 77,616, filed May 2, 1936, issued as Patent No. 2,092,928, September 14, 1937.

One object of this invention is the application of ornamentations, labels, trademarks, and the like, to rubber articles such as bathing suits, caps, shoes, gloves, rubbers, raincoats, aprons, rubber sheets, hot water bottles, novelties, toys and the like.

A further object of this invention is the application of such designs or printed matter to rubber goods, with the design sealed beneath the outer surface of the article, so that it will in no event be marred or destroyed without a complete destruction of the overlying rubber, thus practically insuring the design for the life of the ornamented article. Accordingly, it is also an object of our invention to form such ornamented rubber goods with the rubber overlying the design transparent, so that the design appears perfectly clear, and, in the case of letters, legible, without the presence of interposed fibers or other obstructing foreign matter overlying the design to detract from its clearness or legibility.

Further objects of our invention are the provision of a transparent label having such designs on one face thereof, which label may be sold as such, ready for application to rubber goods with the design bearing face of the label adjacent the goods; and the provision of a label having such designs sealed between the surfaces thereof.

In the drawing

Figure 1:
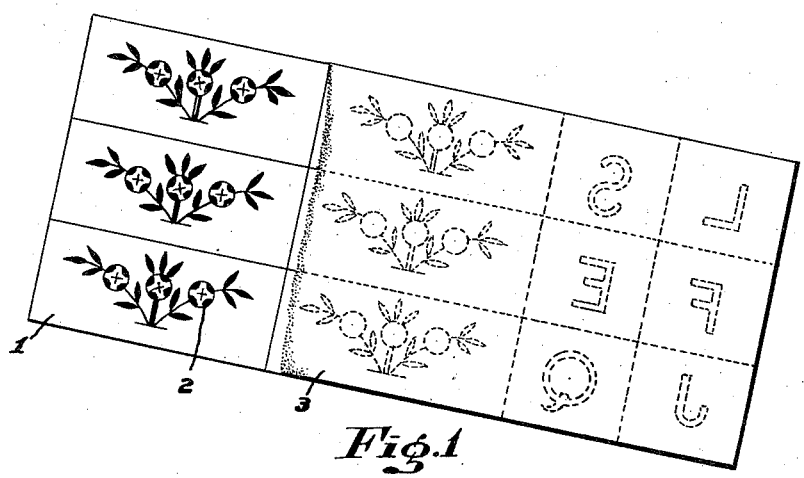
Fig. 1 illustrates our product in an intermediate state of manufacture and diagrammatically indicates certain steps in one method of its manufacture.

A transparent label, having a design on one face thereof, may be formed in any convenient manner. As an example, we describe a transparent latex label made in accordance with the process disclosed in our prior co-pending application previously referred to, in which process a sheet medium bearing a transferable design is brought in contact with liquid latex, so that a film of latex is formed over the sheet medium of a thickness governed by the viscosity of the latex. We mention colored feature, comic, and rotogravure newsprint pages as containing inked designs of the type which may be transferred to produce our ornamented rubber products.

The latex used in the process may be obtained commercially at any desired viscosity or percent total solid contents, compounded with suitable solvents to impart desired characteristics to the product as is understood in the rubber industry. As described in our co-pending application, the latex may be obtained and used in the compounded, vulcanized, natural or natural plus preservative state. While colored or white latex may be employed, in our preferred form we employ a transparent latex, for reasons hereinafter described.

One convenient method for applying the latex is by dipping the sheet medium in fluent latex by passing the design-bearing surface across a surface of latex which is of low viscosity and high in percent total solids, as described in our co-pending application. A stabilizer such as denatured alcohol may be applied, if desired, either to the latex before dipping, or to the film after dipping.

Another method of applying the latex is to place a sheet medium bearing the design, with the design face upward, in a trough or other vessel containing a bath of mercury, and pouring or flowing latex onto the design bearing face of the sheet medium. This process insures the formation of a film of uniform thickness, since the mercury bath provides a constant level support for the latex in the trough.

In either case, the sheet medium having the latex film thereon is dried, either by forced or natural drying, preferably until it reaches the stage of a tacky rubber sheet. If the liquid film is left undisturbed while drying, better transfers will result; pressure is entirely unnecessary.

The sheet medium may be removed from the formed latex sheet by the application of a releasing agent to the sheet medium. In the case of paper, water is a very suitable releasing agent, as it reduces the paper to a pulp, which may be washed from the formed latex sheet without stripping or stretching the latex, leaving a transferred design on the latex sheet. As described in our prior application, this method of removal permits all the fiber of the sheet medium to be removed from the latex sheet, leaving a design which will stretch and flex with the latex sheet.

When the sheet medium is removed, the design bearing face of the latex sheet is exposed, and, if transparent latex has been used, the label can be applied to the article to be identified with the design-bearing face contacting the article, so that when completed the design will be sealed beneath the exposed surface of the label.

Such product as thus far described may be sold as an ordinary label, ready for application to rubber goods with rubber adhesives. In our preferred form, the latex, even after drying, is in a substantially tacky state, so that it may be applied to rubber goods with any suitable adhesive agents. Under such circumstances the label may be handled prior to releasing the sheet medium but after chalking the exposed non-design bearing surface, so that, when the user is ready to apply the label, the sheet medium may be removed and the design bearing face in its tacky state is ready for application to the article, which may or may not also be in a tacky state. If in a tacky state, additional adhesives may be unnecessary.

Obviously, a plurality of designs may be transferred in forming one latex sheet, and the designs may be separated, when required, for individual application to the articles to be identified. Such a sheet is shown in Fig. 1 which illustrates, at the left, an underlying latex sheet 1 to which designs preferably of ink 2 have been transferred from a transfer medium 3 which has subsequently been completely released from the left-hand portion, leaving the latex sheet 1 and exposed designs 2.

After the formation of a label having one face bearing the transferred design, the latex sheet forming process may be performed on either one or both faces of the label, either to build up the thickness of the label or to seal the design between surfaces of the built-up product or both, each film preferably being allowed to dry to the tacky stage before application of a succeeding film. If the design is being sealed between surfaces, transparent latex must be used either initially or on all subsequent applications to the design bearing face, as is obvious, to prevent burying of the design.

Figure 2:
Fig. 2 is an enlarged cross-sectional illustration of our product after a further step in the manufacture.
Figure 3:
Fig. 3 is an enlarged cross-sectional illustration of one embodiment of our product after application to rubber goods.
Figure 4:
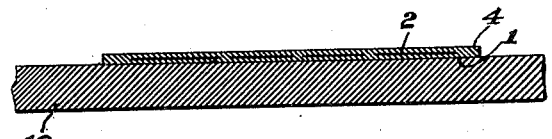
Fig. 4 is an enlarged cross-sectional illustration of the product of Fig. 2 after application to rubber goods.

Such a design 2, sealed between latex layers 1 and 4, as illustrated in Fig. 2, a latex layer having been applied to the design bearing face of the sheet as illustrated in the left-hand portion of Fig. 1. Fig. 4 illustrates the sealed design of Fig. 2 applied to rubber goods 10, as previously described, whereas Fig. 3 illustrates one of the labels of Fig. 1 applied to rubber goods 10 directly with the design bearing surface adjacent the rubber goods, without previous sealing of the design by an overlying layer of latex.

If the design bearing face of the label is given additional coatings of latex after the removal of the sheet medium, it it immaterial which face is applied to the article to be identified, except as governed by requirements of legibility, and by the necessity of always having any rubber overlying the design transparent.

As will be understood, with the use of transparent latex, the design, although sealed beneath the surface, is readily seen through the transparent overlying film, and bears an attractive glossy effect similar to a picture under Cellophane.

Any tackiness of the latex sheet that remains may be removed after application to the rubber goods or at any desired time, by "finishing" the latex with powdered chalk, aqueous bromine or chlorine, or in other manner, all as is well known in the art.

If unvulcanized latex has been used, vulcanization may be effected either after transfer of the design, or after application of the label, with simultaneous vulcanization of the article to which it is applied.

It will also be noted as a feature of our invention, that where the design contains letters, the original sheet medium may bear the transferable design in legible form, the design will appear in reverse on the design bearing face of a transparent latex sheet, but will again appear legible when viewed through the transparent overlying latex sheet. The process is therefore advantageous in the use of any desired print available, without the necessity of reversing the print before its transfer, if the transfer is made onto transparent rubber.

We claim:

1. A process for identifying rubber goods, comprising transferring an inked design to a transparent rubber sheet, and applying said sheet to the article to be identified, with the design bearing face of said sheet adjacent said article.

2. A process for making ornamental rubber articles, comprising transferring an inked design onto a transparent rubber sheet surface, and thereafter applying on the design bearing surface a transparent film of fluent latex, and drying said film to seal the transferred design between surfaces of the formed article, whereby said design is visible from both faces of said sheet.

3. A process for identifying rubber goods, comprising forming a transparent latex film on the face of a sheet medium bearing a transferable design, drying said latex, removing said sheet medium to leave a transparent latex sheet having a transferred design, and applying the latex sheet to the article to be identified with the design bearing face of said latex sheet adjacent said article.

4. A process for making ornamental rubber articles which comprises forming a transparent latex film on the face of a sheet medium bearing a transferable design, drying said latex film, removing said sheet medium to leave a transparent latex sheet having a transferred design, forming a second latex film on the design bearing face of said first film and drying said second film.

JOSEPH S. C. MOODY.
HUGH M. PHINNEY.